United States Patent Office.

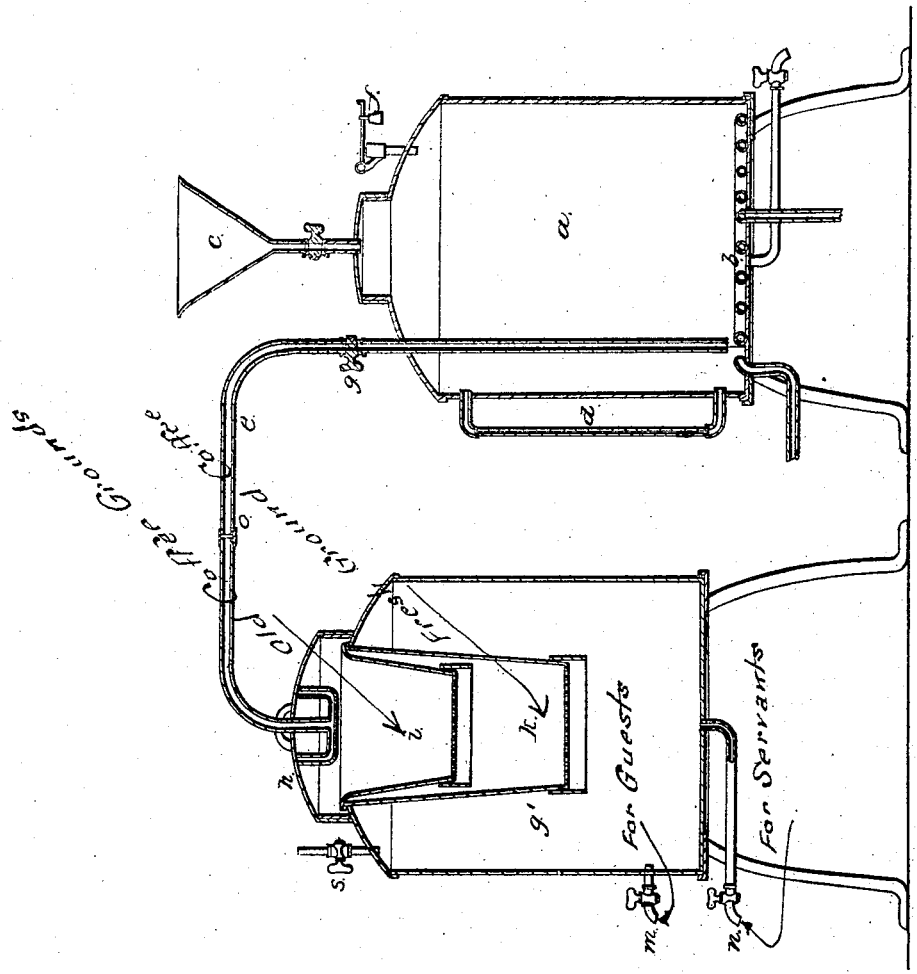

ELIE MONEUSE AND LOUIS DUPARQUET, OF NEW YORK, N. Y.

Letters Patent No. 95,710, dated October 12, 1869.

COFFEE-POT.

The Schedule referred to in these Letters Patent and making part of the same.

*To all whom it may concern:*

Be it known that we, ELIE MONEUSE and LOUIS DUPARQUET, of the city and State of New York, have invented and made a certain new and useful Improvement in Apparatus for Making Coffee; and we do hereby declare the following to be a full, clear, and exact description of the said invention, reference being had to the annexed drawing, making part of this specification, wherein we have represented a vertical section of the said apparatus.

Difficulty has heretofore been experienced in making coffee without loss of the aromatic portions that pass off with the steam, and when coffee is exposed to a continued boiling-operation, the flavor is very much injured, and the coffee becomes thick and unpalatable.

Our apparatus is especially designed for making coffee in considerable quantities, for hotels, dining-saloons, &c., and enables us to extract all the desirable properties from the coffee with great rapidity, so that there will be but little delay in making fresh coffee, as desired, and in large quantities.

The nature of our invention consists in a coffee-pot in which two cocks or faucets are provided, one being at the bottom, for drawing off sediment or an inferior quality of coffee, and the second cock being placed higher up, so as only to draw off the best quality of coffee.

By this arrangement, the inferior coffee can be drawn off for servants and employees in hotels, dining-rooms, &c., while the better quality is supplied to guests.

In the drawing—

$a$ represents a vessel of suitable size, in the bottom of which is a steam-heating coil, $b$ $b$, and upon the closed top of the vessel is a funnel, $c$, and cock, through which pure water is to be supplied to the apparatus, to whatever extent desired, and $d$ is a gauge, by which the height of the water may be observed.

A safety-valve, $f$, should be employed to prevent risk of accident.

A pipe, $e$, and cock, leads to the coffee-extracting vessel $g'$, in the cover $h$, of which the said pipe $e$ branches out in the form of a rose or sprinkler.

$i$ and $k$ are vessels with perforated bottoms, suspended within the vessel $g'$ by flanges around their upper ends.

The water in the vessel $a$ is heated to the boiling-point by the coil $b$, and to a still higher temperature if desired. Coffee, in its fresh-ground condition, is put into the vessel $k$, and the coffee-grounds from the previous extracting-operation are contained in the vessel $i$, the cover $h$ is replaced, the parts of the pipe $e$ slipped together as at $o$, and the cock $g$ opened, and the pressure of steam forces the boiling water over into the vessel $g'$, and in its descent, it first extracts any portion of the soluble properties that may remain in the grounds in the vessel $i$, and also draws the extract from the coffee in the vessel $k$.

If the coffee is to remain in the vessel $g'$, I prefer to have the vessels $i$ and $k$ lifted out, and the coffee can be drawn from the cock $m$ for guests, and the poorer quality, that may be rather thick, can be drawn from the cock $n$, for the servants.

We prefer to employ this apparatus simply for extracting the coffee, and when the same has remained a sufficient time for the sediment to fall below the cock $m$, to draw off the pure, clear coffee into an earthen vessel heated by steam-coil, or otherwise.

The pipe and cock $s$ allow the escape of air or steam.

What we claim, and desire to secure by Letters Patent, is—

The coffee-pot or holder, with the cocks $m$ and $n$, introduced, the one higher up than the other, for the purposes, and as specified.

In witness whereof, we have hereunto set our signatures, this 6th day of May, 1868.

ELIE MONEUSE.
    LOUIS DUPARQUET.

Witnesses:
 CHAS. H. SMITH,
 GEO. T. PINCKNEY.